(12) United States Patent
Kubsik

(10) Patent No.: US 6,773,574 B2
(45) Date of Patent: Aug. 10, 2004

(54) METHOD AND APPARATUS FOR REMOVING THIMBLES FROM THE STUBS OF AN ANODE

(75) Inventor: Robert Kubsik, West Bloomfield, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 117 days.

(21) Appl. No.: 10/182,789

(22) PCT Filed: Jan. 31, 2001

(86) PCT No.: PCT/US01/03055

§ 371 (c)(1),
(2), (4) Date: Jul. 31, 2002

(87) PCT Pub. No.: WO01/57291

PCT Pub. Date: Aug. 9, 2001

(65) Prior Publication Data

US 2003/0013775 A1 Jan. 16, 2003

Related U.S. Application Data

(60) Provisional application No. 60/179,720, filed on Feb. 1, 2000.

(51) Int. Cl.[7] .............................. C25C 3/06; C25C 3/00
(52) U.S. Cl. .................... 205/389; 204/245; 204/279
(58) Field of Search .................... 205/389; 204/245, 204/279

(56) References Cited

U.S. PATENT DOCUMENTS

| | | | |
|---|---|---|---|
| 4,007,533 A | * | 2/1977 | Brandon et al. ............... 29/762 |
| 4,514,873 A | | 5/1985 | Golla |
| 4,797,831 A | | 1/1989 | Dressing et al. |
| 5,154,813 A | * | 10/1992 | Dill ........................ 204/288.2 |
| 5,661,656 A | | 8/1997 | Goldman |
| 5,730,855 A | * | 3/1998 | Luebke et al. ............... 205/354 |
| 5,733,423 A | | 3/1998 | Caspelherr |
| 5,813,263 A | | 9/1998 | Tokai |
| 5,941,111 A | | 8/1999 | Skala et al. |
| 5,956,842 A | | 9/1999 | Stewart |
| 5,974,642 A | | 11/1999 | Weeks et al. |

* cited by examiner

Primary Examiner—Donald R. Valentine
(74) Attorney, Agent, or Firm—Dickinson Wright PLLC

(57) ABSTRACT

An apparatus and method for removing thimbles (12) from stubs (20) of an anode yoke which includes the step of advancing a ram (20) towards each stub with the force applied by the ram against the stub being limited to a preset maximum, and another step of advancing the rams at the same speed to push the stubs through the thimbles.

16 Claims, 3 Drawing Sheets

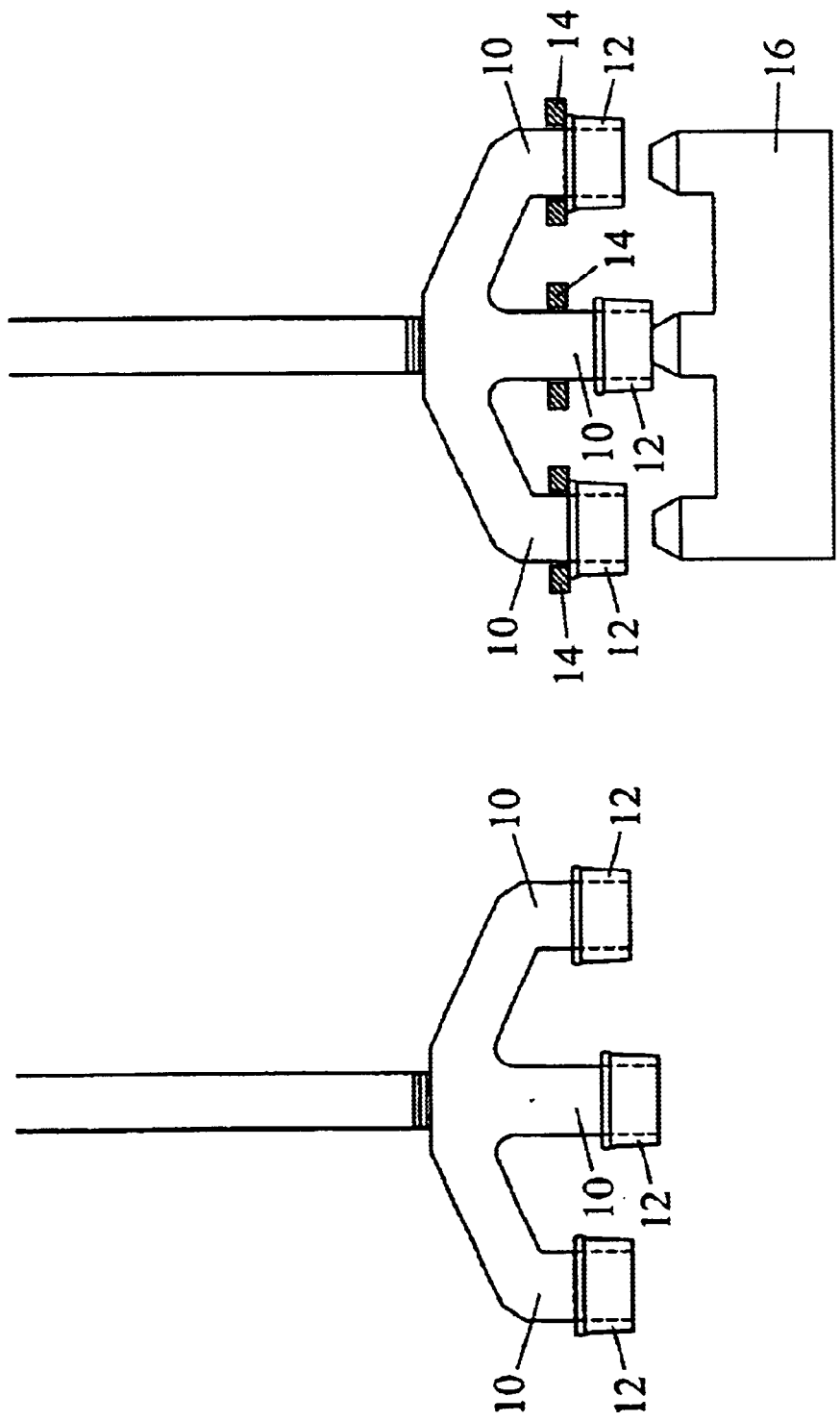

METHOD AND APPARATUS FOR REMOVING THIMBLES FROM THE STUBS OF AN ANODE

This application claims the priority of U.S. provisional patent application 60/179,720, filed Feb. 1, 2000, which application is incorporated by reference in its entirety.

FIELD OF THE INVENTION

The present invention relates to a method and apparatus for removing thimbles from the stubs of anodes, such as anodes used in the electrolytic smelting of metals such as aluminum.

BACKGROUND OF THE INVENTION

A carbon anode block, used in the electrolytic smelting of metals such as aluminum, is supported by yoke stubs attached to an anode rod. As shown in FIG. 1, each yoke stub 10 has a thimble 12 fitted at its end, and the thimbles 12 may be cast within recesses in the carbon anode block. During the electrolytic smelting of metals, the carbon anode block is consumed. To replace the consumed carbon anode block, the anode remnants and the thimbles are removed from the anode yoke stubs with a machine known as a thimble press.

A conventional thimble press generally includes a single ram that is used to push the stubs through the thimbles, thereby removing the thimbles from the stubs. In operation, as shown in FIG. 2, a clamp 14 is placed around each stub 10, with the opening of the clamp 14 small enough to prevent the thimble 12 attached to the end of the stub 10 from passing through. The ram 16 then pushes the stubs 10 (and the thimbles 12) towards the clamps 14. When a thimble 12 comes in contact with a stationary clamp 14, the movement of the thimble 12 is stopped, and the movement of the stub 10 continues, allowing the clamp 14 to stripe the thimble 12 from the end of the stub 10.

One of the disadvantages of conventional thimble presses is that the removal of the thimbles using a single ram may generate a significant bending moment in the yoke, which may either damage the yoke or shorten its operating life. This occurs when the ends of the stubs are not even (not unusual under normal working conditions) and thus don't come in contact with the cam at the same time. For example, in the case illustrated in FIG. 2 where the middle stub 10 is longer than the two side stubs 10, the ram 16 can only push against the middle stub 10, and the removal of the two side thimbles 12 generates a bending moment in each of the yoke arms. For example, if 5,000 kg of force is required to remove a thimble and the distance between the middle stub and each of the side stubs is 1 meter, the removal of the side thimbles generates a bending moment of 5,000 kg-m in each of the yoke arms.

SUMMARY OF THE INVENTION

The method and apparatus embodying the various aspects of the present invention overcome the problems associated with conventional thimble presses.

In accordance with one aspect of the invention, an apparatus for removing thimbles from stubs of an anode yoke includes a number of separate rams and a ram control system. The rams preferably are capable of independent movements, which are controlled by the ram control system. The ram control system has two modes. In the first mode, each ram is advanced towards a stub, and the ram force is limited to a preset maximum value. When the ram has contacted the stub, the advancement of the ram may be stopped because the maximum ram force may be insufficient to move the stub. In the second mode, the rams are advanced at about the same speed, preferably at the same speed, to push the stubs through the thimbles, thereby removing the thimbles from the stubs. Preferably, the ram control system remains in the first mode until each ram has come in contact with a ram and/or until the force applied by each ram against the stub has reached the present maximum value.

In accordance with another aspect of the invention, a method for removing thimbles from stubs of an anode yoke includes the step of advancing a ram towards each stub with the force applied by the ram against the stub being limited to a preset maximum, and another step of advancing the rams at the same speed, preferably at the same speed, to push the stubs through the thimbles, preferably while not limiting the force applied by each ram to the preset maximum force. In a preferred embodiment, the first step precedes the second step.

The present invention has a number of advantages over conventional thimble presses. For example, during the removal of the thimbles, a preferred embodiment of the present invention does not generate a sufficiently large bending moment in the yoke arms so as to damage the yoke or shorten its operating life. The reason for this advantage is that in a preferred embodiment of the present invention, a thimble is removed by pushing primarily against the stub on which the thimble is installed. In other words, the force used to remove a thimble is generated by the ram which is pushing the stub on which the thimble is installed. In conventional thimble presses, a thimble may be removed by pushing against one or more other stubs when the stubs are not even.

BRIEF DESCRIPTION OF THE DRAWINGS

FIG. 1 is a view of anode rod, anode yoke and thimbles attached to the yoke tubes.

FIG. 2 is an illustration of the operation of a conventional thimble press.

DESCRIPTION OF THE PREFERRED EMBODIMENTS

The following description of the presently preferred embodiments of the invention refers to the accompanying drawings. The description is directed to and the drawings show exemplary embodiments of the invention, other embodiments are possible, and changes may be made to the embodiments described below without departing from the spirit and scope of the invention. The scope of the invention is defined by the appended claims, and the description and drawings are merely illustrative, not limiting.

Figures 3A, 3B, 3C:
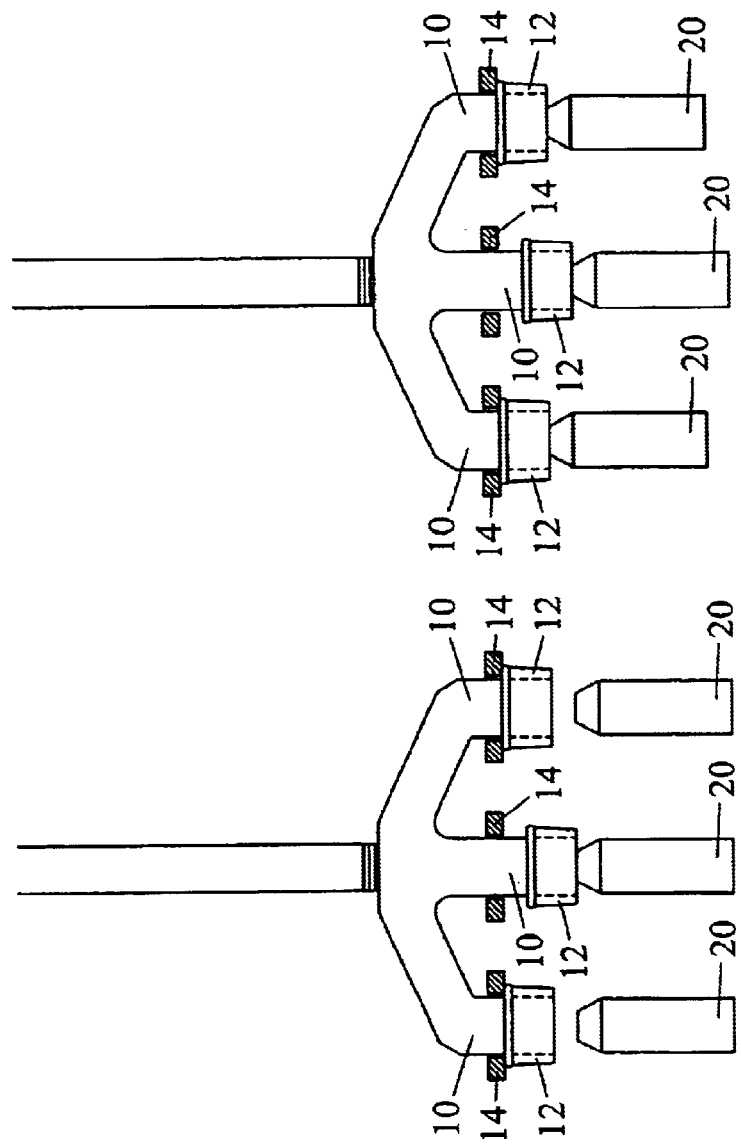
FIGS. 3A, 3B and 3C illustrate the operation of a thimble press of the present invention.
Figure 4:
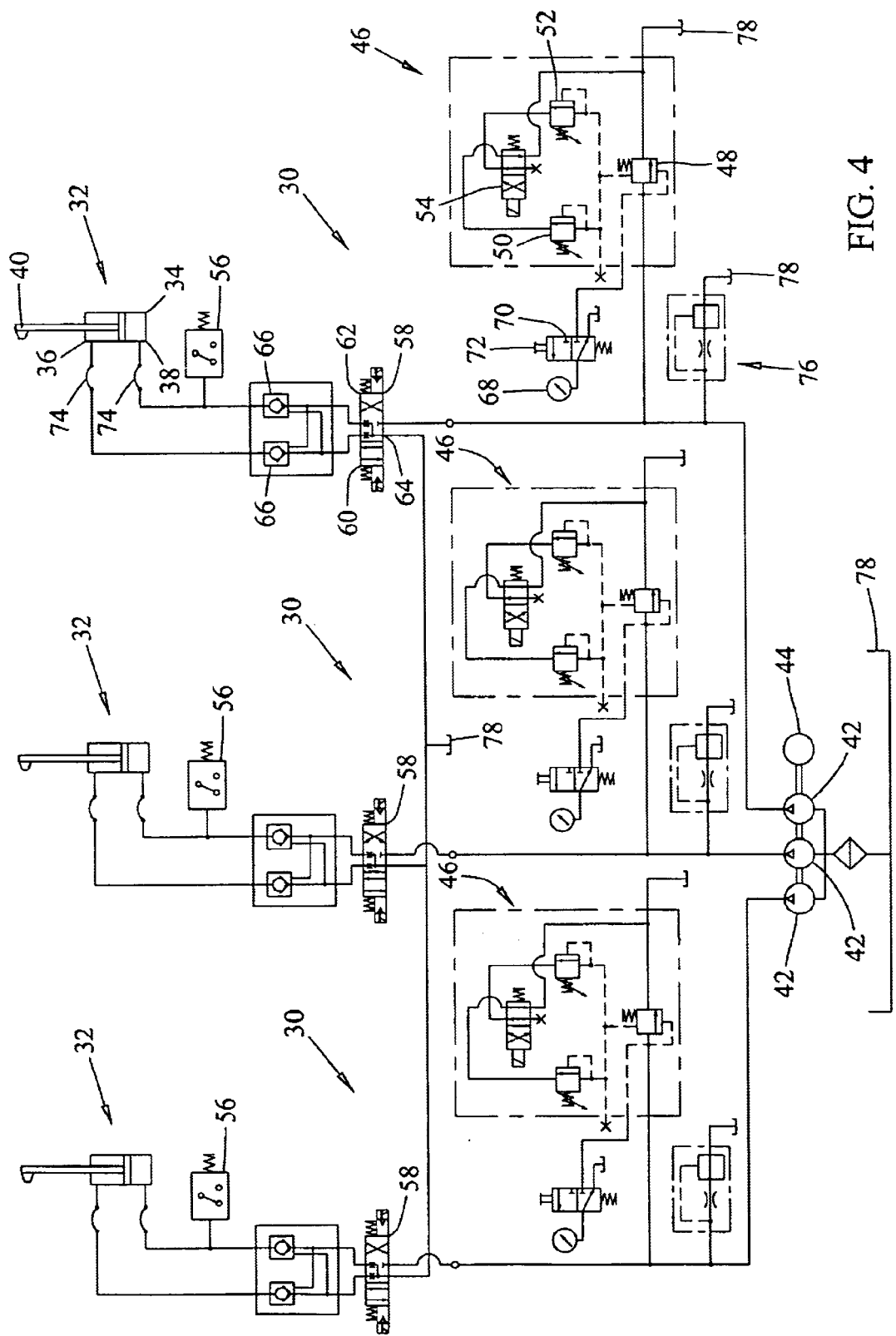
FIG. 4 is a diagram of a hydraulic ram control system of the present invention.

As illustrated in FIGS. 3A and 4, an embodiment of the apparatus for removing thimbles 12 from the stubs 10 of an anode yoke includes a plurality of rams 20 and a ram control system.

The apparatus may include any number of rams, preferably at least as many as there are stubs. Each ram 20 may be used to push against a stub 10, preferably against an end of the stub 10, and may have any configuration suitable for this purpose. The rams 20 can move independently with respect to each other. In the illustrated embodiment, each ram 20 has a generally cylindrical configuration, although it may have any one of other suitable configurations. Preferably, each ram 20 can easily pass through the opening of the thimble 12, allowing the ram 20 to push the stub 10 through the thimble 12. In the illustrated embodiment, this means that the diameter of the ram 20 is less than the inner diameter of the thimble 12.

The apparatus may include a plurality of stops, each of which may be used to stop a thimble or hold it stationary while the stub is being pushed through the thimble. There are a wide variety of devices that can be used for this purpose. For example, a clamp 14 may be placed around the stub 10 above the thimble 12 as shown in FIG. 3, and can be used to stop the upward movement of the thimble 12 as the ram 20 pushes the stub 10 upwards, allowing the thimble 12 to be removed from the stub 10. Preferably, the clamp 14 is sufficient strong so it can withstand the force generated by the ram 20.

The ram control system is used to control the movement of the rams 20 so that no substantial stress is generated in the yoke. In a preferred embodiment, the ram control system includes two modes. In the first mode, the rams 20 are pushed towards the stubs 10, preferably with the force applied to each ram 20 limited to a maximum value. If a ram 20 encounters a resistance that the maximum ram force cannot overcome, the ram 20 will preferably stop. For example, if a ram 20 has come in contact with the end of a stub 10 and the maximum ram force is not sufficient to overcome the resistance created by the stub 10, the ram 20 may stop with the ram 20 abutting the end of the stub 10. However, even if one or more rams 20 have stopped, the other rams 20 may continue to move forward as long as they have not encountered resistance greater than the maximum ram force. Preferably, the maximum ram force is sufficient large to ensure that the rams 20 will all reach the stubs 10 but is not so large as to damage the yoke or shorten its service life. After all the ram forces have reached the maximum value and/or each ram 20 has come in contact with a stub 10, as shown in FIG. 3B, the ram control system preferably will enter the second mode.

In the second mode, all the rams 20 preferably will move with substantially the same speed. In this mode, the force applied by each ram 20 preferably is not limited to the preset maximum ram force discussed in connection with the first mode, allowing the ram 20 to push the stub 10 through the thimble 12. Preferably, a stop or the like is used to stop the movement of a thimble 12 and/or hold the thimble 12 stationary while the stub 10 is being pushed through the thimble 12, as shown in FIG. 3C.

The ram control system may include another mode that preferably follows the second mode. In this mode, the rams 20 retract after the thimbles 12 have been removed from the stubs 10.

A ram control system of the present invention may be an electromechanical, hydraulic or pneumatic system. Shown in FIG. 4 is an example of a hydraulic ram control system. The system includes a number of hydraulic circuits 30, one for each ram 20. Although the three hydraulic circuits 30 shown in FIG. 4 are identical, they may be different. Each hydraulic circuit 30 includes a piston-cylinder arrangement 32 for driving the ram 20, and a hydraulic pump 42 for driving the piston-cylinder arrangement 32. Preferably, the hydraulic pumps 42 are arranged in parallel and driven by a single motor 44, such as an electric motor. With this arrangement, the pumps 42 (and the motor 44) will rotate at about the same speed.

Preferably, each hydraulic circuit 30 also includes a mechanism for limiting the pressure of the circuit 30 to a preset maximum, a feature that can be used to limit the force applied by the piston-cylinder arrangement 32 to a preset maximum when the ram control system is in the first mode. With this arrangement, the maximum ram force is equal to the product of the maximum pressure and the effective piston area. In each of the circuits 30 illustrated in FIG. 4, this mechanism includes a pressure reducing valve 46 which opens to allow the hydraulic fluid to escape when the circuit pressure reaches a preset value, thus limiting the circuit pressure to the preset value. When the ram control system is in the second mode, the pressure reducing valve 46 may be changed to a higher setting, making the valve function as a safety valve. In the illustrated embodiment, the pressure reducing valve 46 includes a main pressure relief valve 48 and two pressure relief valves 50, 52 used to control the setting (pilot pressure) of the main pressure relief valve 48. The first pilot pressure relief valve 50 is set at the maximum pressure allowed when the ram control system is in the first mode so that the main pressure relief valve 48 will open when the pressure reaches the maximum pressure, thus limiting the circuit pressure to the maximum pressure. The second pilot pressure relief valve 52 is set at a higher pressure so that the main pressure relief valve 48 functions as a safety valve when the ram control system is in the second mode. The ram control system exits the first mode and enters the second mode by switching from the first relief valve 50 to the second relief valve 52. The switch between the first and second relief valves 50, 52 is accomplished with a four-way, two-position solenoid valve 54.

Alternatively, each hydraulic circuit 30 may use a pressure-controlled, variable displacement pump, instead of a pressure reducing valve, to limit the circuit pressure to the maximum allowed when the ram control system is in the first mode. The maximum pressure allowed by the pump can be adjusted to a higher value when the ram control system is in the second mode.

Each hydraulic circuit 30 may also include a pressure sensor 56, such as a pressure switch, which is used to monitor whether the circuit pressure has reached the maximum pressure. When the pressure sensors 56 indicate that all circuit pressures have reached the maximum pressure, indicating all rams 20 have come in contact with a stub 10, then the ram control system may enter the second mode. Alternatively, instead of a pressure sensor, a flow meter may be installed in each hydraulic circuit to determine whether there is a sufficient fluid flow through the main relief valve 48, indicating the main relief valve 48 is open. An open main relief valve 48 indicates that the circuit pressure has reached the maximum value.

As discussed above, each hydraulic circuit may include another mode, in which the rams retract after the thimbles have been removed. There are a number of ways to implement this. In the embodiment shown in FIG. 4, for example, a four-way, three-position solenoid valve 58 is provided. When the valve 58 is at the left position 60, the ram control system is in this third mode, in which the upper chamber 36 of the cylinder 34 is connected to the pump 42 and the lower chamber 38 connected to the hydraulic fluid tank 78, forcing the piston 40 to retract to its lower position. When the valve 58 is at the right position 62, the ram control system is in either the first or the second mode. The normal position of the valve is the middle position 64. In case of a system failure, the valve is returned to the middle position 64, and the one-way check valves 66 ensure that the piston 40 (and the ram 20) stays at its position.

Each hydraulic circuit may also include a number of auxiliary components. For example, as shown in FIG. 4, each circuit 30 may include a pressure gage 68. Normally the pressure gage 68 is isolated by a manual valve 70 from circuit pressure. A reading can be taken from the pressure gage 68 by pushing the button 72 of the manual valve 70 to connect the pressure gage 68 to the hydraulic circuit 30. In addition, each hydraulic circuit 30 may include flexible hoses 74, which allow the piston-cylinder arrangement 32 to move about during operation. Each hydraulic circuit 30 may also include an air bleed valve 76 which bleeds out air contained in the hydraulic fluid.

In operation, the anode block is first positioned so that its stubs 10 are aligned respectively with the rams 20 of the thimble 12 press. Then a clamp 14 is placed around each stub 10 above the thimble 12. The ram control system then advances the ram 20 towards the stubs 10 with the force applied by each ram 20 limited to the maximum pressure. In the illustrated embodiment, the movement of a ram 20 (and the piston 40) is accomplished by positioning the three-position valve in the right position and supplying the lower chamber 38 of the cylinder 34 with pressured hydraulic fluid supplied by the pump 42. The pressure reducing valve 46 is set so that the circuit pressure does not exceed the preset maximum value. When it reaches the stub 10, each ram 20 preferably will stop because the maximum ram force is not sufficient to move the stub 10. When all the rams 20 have come in contact with the respective stubs 10, as shown in FIG. 3B, the ram control system enters the second mode, and the rams 20 move forward at about the same speed. When each thimble 12 is stopped by a clamp 14, the ram 20 pushes the stub 10 through the thimble 12, removing the thimble 12 from the stub 10, as shown in FIG. 3C. Then the three-position valve is placed in the left position, placing the ram control system in the third mode. In this mode, the pistons 40 (and the rams 20) retract to their original positions.

What is claimed is:

1. An apparatus for removing thimbles from stubs of an anode, the apparatus comprising:
    a plurality of rams having independent movements; and
    a ram control system including,
        a first mode designed to advance each ram towards a stub and the force applied by the ram against the stub is limited to a preset maximum force, and
        a second mode designed to advance the rams at the same speed to push the stubs through the thimbles.

2. The apparatus of claim 1 further including a plurality of stops, wherein each stop is positioned to stop the movement of one of the thimbles, thereby allowing the ram to push the stub through the thimble 3. The apparatus of claim 1, wherein the ram control system is a hydraulic system.

4. The apparatus of claim 3 further including a plurality of hydraulic circuits, each hydraulic circuit being operatively associated with one of the rams to drive the ram.

5. The apparatus of claim 4, wherein each hydraulic circuit includes a piston-cylinder arrangement for driving the ram associated with the hydraulic circuit.

6. The apparatus of claim 5, wherein each hydraulic circuit includes a pump operatively connected to the piston-cylinder arrangement of the circuit.

7. The apparatus of claim 6, wherein the pumps have the same displacement and are arranged in tandem with a motor to synchronize the movement of the piston-cylinder arrangements.

8. The apparatus of claim 5, where n each hydraulic circuit includes a pressure reducing valve, wherein the pressure reducing valve limits the pressure of the circuit to a preset maximum pressure when the ram control system is in the first mode, thereby limiting the force applied by the ram against the stub is limited to the preset maximum force.

9. The apparatus of claim 8, wherein each hydraulic circuit includes a pressure sensor, wherein the ram control system enters the second mode when the pressure sensor of each hydraulic circuit indicates that the pressure of the hydraulic circuit has reached the preset maximum pressure.

10. The apparatus of claim 9, wherein the pressure of each hydraulic circuit is not limited to the preset maximum pressure when the ram control system is in the second mode.

11. A method for removing thimbles from stubs of an anode, the method comprising:
    advancing a ram towards each stub, while limiting the force applied by the ram against the stub to a preset maximum force; and
    advancing the rams at the same speed to push the stubs through the thimbles, while not limiting the force applied by each ram to the preset maximum force.

12. The method of claim 11, wherein starting advancing the rams at the same speed after the forces applied by the rams against the stubs reach the preset maximum forces.

13. The method of claim 11 further including holding at least one of the thimbles stationary while advancing the rams at the same speed to push the stubs through the thimbles.

14. The method of claim 11, wherein advancing a ram towards each stub includes advancing the ram towards the stub using a hydraulic circuit that includes a piston-cylinder arrangement and a pump operatively connected to the piston-cylinder arrangement.

15. The method of claim 14, wherein limiting the force applied by the ram against the end to the preset maximum force includes limiting the pressure of the hydraulic circuit to a preset maximum pressure.

16. The method of claim 15, wherein advancing the rams at the same speed includes providing the pumps with the same displacement and driving the pumps in tandem.

* * * * *